(12) United States Patent
Cepas et al.

(10) Patent No.: US 7,489,198 B1
(45) Date of Patent: Feb. 10, 2009

(54) LINEAR REGULATING SWITCH

(75) Inventors: Bruce M. Cepas, Little Egg Harbor, NJ (US); Noel Delgado, Mount Laurel, NJ (US); Daniel H. McCauley, IV, Palmyra, NJ (US); Yan Zheng, Philadelphia, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/789,874

(22) Filed: Apr. 26, 2007

(51) Int. Cl.
- *G05F 1/00* (2006.01)
- *H03G 3/00* (2006.01)
- *H03F 3/04* (2006.01)
- *H02M 3/18* (2006.01)

(52) U.S. Cl. .................. 330/297; 323/265; 323/271; 330/127; 363/60

(58) Field of Classification Search .............. 323/271, 323/265; 330/127, 297; 363/60
See application file for complete search history.

(56) References Cited

U.S. PATENT DOCUMENTS

| | | | |
|---|---|---|---|
| 5,017,927 A | 5/1991 | Agrawal et al. | |
| 5,115,244 A | 5/1992 | Freedman et al. | |
| 5,196,857 A | 3/1993 | Chiappetta | |
| 5,214,439 A | 5/1993 | Reed | |
| 5,258,771 A | 11/1993 | Praba | |
| 5,615,004 A | 3/1997 | Nourrcier, Jr. | |
| 5,638,163 A | 6/1997 | Nourrcier, Jr. | |
| 6,121,760 A * | 9/2000 | Marshall et al. | 323/282 |
| 6,229,289 B1 | 5/2001 | Piovaccari et al. | |
| 6,275,395 B1 * | 8/2001 | Inn et al. | 363/60 |
| 6,438,462 B1 | 8/2002 | Hanf et al. | |
| 6,462,523 B1 | 10/2002 | Wannenmacher | |
| 6,489,756 B2 | 12/2002 | Kanouda et al. | |
| 6,559,623 B1 * | 5/2003 | Pardoen | 323/274 |
| 6,624,702 B1 * | 9/2003 | Dening | 330/297 |
| 6,762,945 B2 | 7/2004 | Morgen | |
| 6,884,910 B2 | 4/2005 | Harris | |
| 7,098,636 B2 * | 8/2006 | Koerner et al. | 323/268 |
| 2002/0024389 A1 * | 2/2002 | Nishiyama | 330/297 |
| 2003/0107440 A1 * | 6/2003 | Miki et al. | 330/297 |
| 2003/0137286 A1 * | 7/2003 | Kimball et al. | 323/271 |

* cited by examiner

*Primary Examiner*—Akm E Ullah
*Assistant Examiner*—Jue Zhang
(74) *Attorney, Agent, or Firm*—Duane Morris LLP

(57) ABSTRACT

A switched linear regulator includes a control device with a controlled current path and a control electrode. The current path is connected in series with a source of voltage and a load. An error signal generator compares the load voltage with a reference value to generate a degenerative error signal. The error signal is coupled to the control electrode with a voltage offset. An OFF control signal source includes a transistor which is connected to the control electrode to swamp or overpower the error signal, and render the controlled current path nonconductive. Thus, the same active control element both linearly regulates and provides an ON-OFF function. A speed-up transistor responds to the OFF signal to short the control electrode to a reference voltage to quickly discharge capacitance at the control electrode.

3 Claims, 3 Drawing Sheets

US 7,489,198 B1

LINEAR REGULATING SWITCH

FIELD OF THE INVENTION

This invention relates to power supplies for powering loads which require switching ON and OFF, and more particularly to linear regulating power supplies which can be switched between ON and OFF states for providing power for such loads.

BACKGROUND OF THE INVENTION

Antennas are recognized as being transducers which transduce electromagnetic signals between the guided-wave form, in which the direction of propagation is controlled by a conductive or dielectric waveguide, and a free-space form, in which the propagation takes place in an unguided manner. Those skilled in the art know that many terms associated with antennas are used for historical reasons. For example, at a time at which reception of signals was accomplished only by the use of a long wire connected to the receiver, antenna coupling problems were experienced only when high power was involved, which was the case with transmitting antennas. These antenna coupling problems were discussed in terms of radiation of signals applied to a "feed" point or terminals of the antenna. Only later was it recognized that the radiation pattern and impedance characteristics of antennas were identical regardless of the direction of transduction, but by that time the "feed" terminology was firmly established. Thus, both transmitting and receiving antennas have "feed" points or terminals, and characteristics which are the same. Thus, descriptions of antenna operation may be couched in terms of transmission or reception modes, whichever provides the greater clarity in a given context, with the operation in the other mode being understood from the one description.

Antennas are widely used, to the extent that modern communication and sensing would be unrecognizable without their application. Many antenna types are known, including the long-wire Beverage antenna, the dipole and its monopole-over-ground-plane equivalent. The monopole and dipole antenna linear antennas have well-known radiation and impedance characteristics. Among the radiation pattern characteristics of monopole and dipole antennas are relatively limited bandwidth and relatively low gain, which tend to reduce their usefulness for demanding applications.

The art of arraying of elemental antennas such as monopoles and dipoles has long been used to ameliorate some of the disadvantages of linear antennas. Broadband arrays of dipoles and monopoles are known in the form of one-dimensional or line arrays, which tend to provide greater directivity than a single antenna element. Among the line arrays are log-periodic arrays, in which the dimensions of the constituent antenna elements vary in a monotonic manner along the length of the antenna. Log-periodic arrays, in addition to providing more directive gain than a single linear antenna, also have theoretically unlimited bandwidth. U.S. Pat. Nos. 5,196,857 issued Mar. 23, 1993 in the name of Chiappetta and 5,214,439 issued May 25, 1993 in the name of Reed describe log-periodic arrays. Another widely used type of array is the planar array, which is a two-dimensional arraying of elemental antennas. As ordinarily configured, such planar arrays can provide relatively high directivity in a direction orthogonal to the plane of the array. Those skilled in the art know that many different types of elemental antennas can be arrayed in two dimensions. For example, U.S. Pat. No. 5,258,771 issued Nov. 2, 1993 in the name of Praba describes a two-dimensional array of elemental helix antennas.

For some uses, two-dimensional arrays of antenna elements may include hundreds or even thousands of elemental antennas. The use of elemental antennas in an array may require a transmit-receive (TR) "feed" module for each elemental antenna. One arrangement for implementing transmit-receive feed modules for a two-dimensional array of elemental antennas is described in U.S. Pat. No. 5,017,927, issued May 21, 1991 in the name of Agrawal et al. Another feed arrangement for a two-dimensional antenna array is described in U.S. Pat. No. 5,115,244, issued May 19, 1992 in the name of Freedman et al. Regardless of the type of feed, cost considerations become important when considering arrays of more than a few elements. The cost of the elemental antennas and their ancillary components is of more than passing interest when large numbers of elements are to be used. In this regard, the cost of the individual transmit-receive (TR) modules may be greater than that of the antenna element with which it is associated. Additional cost considerations associated with the use of TR modules relate to the amount of power which the array of modules consumes, which is inextricably linked to the power efficiency of each module. Small increments or decrements in the power consumption of each module can substantially affect the amount of heat-dissipating capability which must be provided for the array, which in turn impacts on the type of mechanical structure required for support and heat conduction. In some cases, liquid coolant paths may be necessary.

While the costs of the TR modules and antenna elements of an array are very important, reliability and performance must be taken into account. When thousands or tens of thousands of elements are used for transduction for generating one or more antenna beams, the TR modules and their connections to control elements must be very reliable. Not only must they be reliable, but the radio-frequency transmissions from each module and element of the array must be in time synchronism.

Improved or alternative antenna array arrangements are desired.

SUMMARY OF THE INVENTION

A switched linear regulator includes a control device with a controlled current path and a control electrode. The current path is connected in series with a source of voltage and a load. An error signal generator compares the load voltage with a reference value to generate a degenerative error signal. The error signal is coupled to the control electrode with a voltage offset. An OFF control signal source includes a transistor which is connected to the control electrode to swamp or overpower the error signal, and render the controlled current path nonconductive. Thus, the same active control element both linearly regulates and provides an ON-OFF function. A speed-up transistor responds to the OFF signal to short the control electrode to a reference voltage to quickly discharge capacitance at the control electrode.

A switched source of linearly regulated voltage according to an aspect of the invention comprises a source of nominally unregulated direct voltage, and a load for receiving switched regulated direct voltage. A solid-state device defines first and second terminals and a controllable path for the flow of current therebetween. The solid-state device also defines an electrical control terminal for controlling the flow of current through the controllable path. A current conducting arrangement or means serially couples or connects the source, the path, and the load to allow flow of current during those times in which the path is conductive. A regulation control arrangement or means senses the voltage across the load, and compares the sensed voltage with a reference voltage in order to generate a degenerative error signal at the control terminal. The degenerative error signal at the control terminal tends to maintain the voltage across the load constant. An OFF control signal source is coupled to the control terminal, for overriding or swamping the error signal and for disabling the path during OFF times. In a switched source according to one embodiment of this aspect of the invention, the solid-state device is a field-effect transistor defining a source and a drain, and a controllable path for current therebetween, and also defining an electrical control gate terminal for controlling the flow of current through the controllable path. In a preferred embodiment, the load comprises an RF amplifier including an RF input port and an RF output port, and in which the amplifier continuously receives RF signal at the input port, for amplifying RF signal applied to the input port to produce amplified RF signal at the output port during those times in which the ON-OFF control signal does not command an OFF state, and for producing no amplified RF signal at the output port during those times in which the control signal commands an OFF state.

According to another aspect of the invention, a switched source of linearly regulated voltage comprises a source of nominally unregulated direct voltage and a load for receiving switched regulated direct voltage having a first value. A solid-state device defines first and second terminals and a controllable path for the flow of current therebetween. The solid-state device also defines an electrical control terminal for controlling the flow of current through the controllable path. A current conducting arrangement or means serially couple the source, the path, and the load to allow flow of current during those times in which the path is conductive. Regulation control arrangement or means sense the voltage across the load, and compare the sensed voltage with a reference voltage to generate a degenerative error signal centered about a second voltage having a value different from the first value. Voltage shifting means are coupled to the regulation control means and to the control terminal, for shifting the value of the degenerative error signal to the first value at the control terminal, whereby, or as a result of which, the voltage across the load tends to be maintained constant. An ON-OFF control signal source is coupled to the control terminal, for overriding the error signal and for disabling or rendering nonconductive the path during OFF times.

DESCRIPTION OF THE INVENTION

It is often desired to transmit pulses of radio-frequency (RF) electromagnetic energy, as in each transmit-receive (TR) module of an array antenna. The transmission of a pulse of RF energy requires starting and stopping the flow of RF energy. Since a TR module contains an RF energy or signal flow path, pulsatory behavior can be accomplished by enabling and disabling the RF signal flow path. Many RF switch schemes are known. Thus, a discrete switch element in the signal path can be enabled and disabled in order to thereby generate pulses. Such an arrangement is advantageous in that the switch element can be optimized for high-speed operation in response to control signals distributed through the array, to thereby enhance simultaneity of switching. If the switching is not simultaneous, the antenna beam will not be properly formed. The use of separate RF switching elements, while advantageous in some regards, adds cost and, due to an increase in the number of active elements, reduces reliability.

According to an aspect of the invention, the RF signal energy is continuously applied to the transmit-signal amplifier portion of each transmit-receive module, and the transmit-signal amplifier is switched ON and OFF by switching of its electrical energization. According to another aspect of the invention, the switching of the electrical energization is accomplished by the same active element that performs linear voltage regulation, thus eliminating a switch. The switching by the linear regulation element eliminates power dissipation losses attributable to the use of a separate switching element, thus reducing the overall power consumption or dissipation of each TR module. In addition, voltage regulation is improved by elimination of a switching element lying between the voltage regulator and the amplifier or other load. The improvement of regulation, in turn, tends to reduce RF energy "sag" or "droop" occurring during the RF pulse due to change of properties of the switching element due to heating during the pulse.

Figure 1:
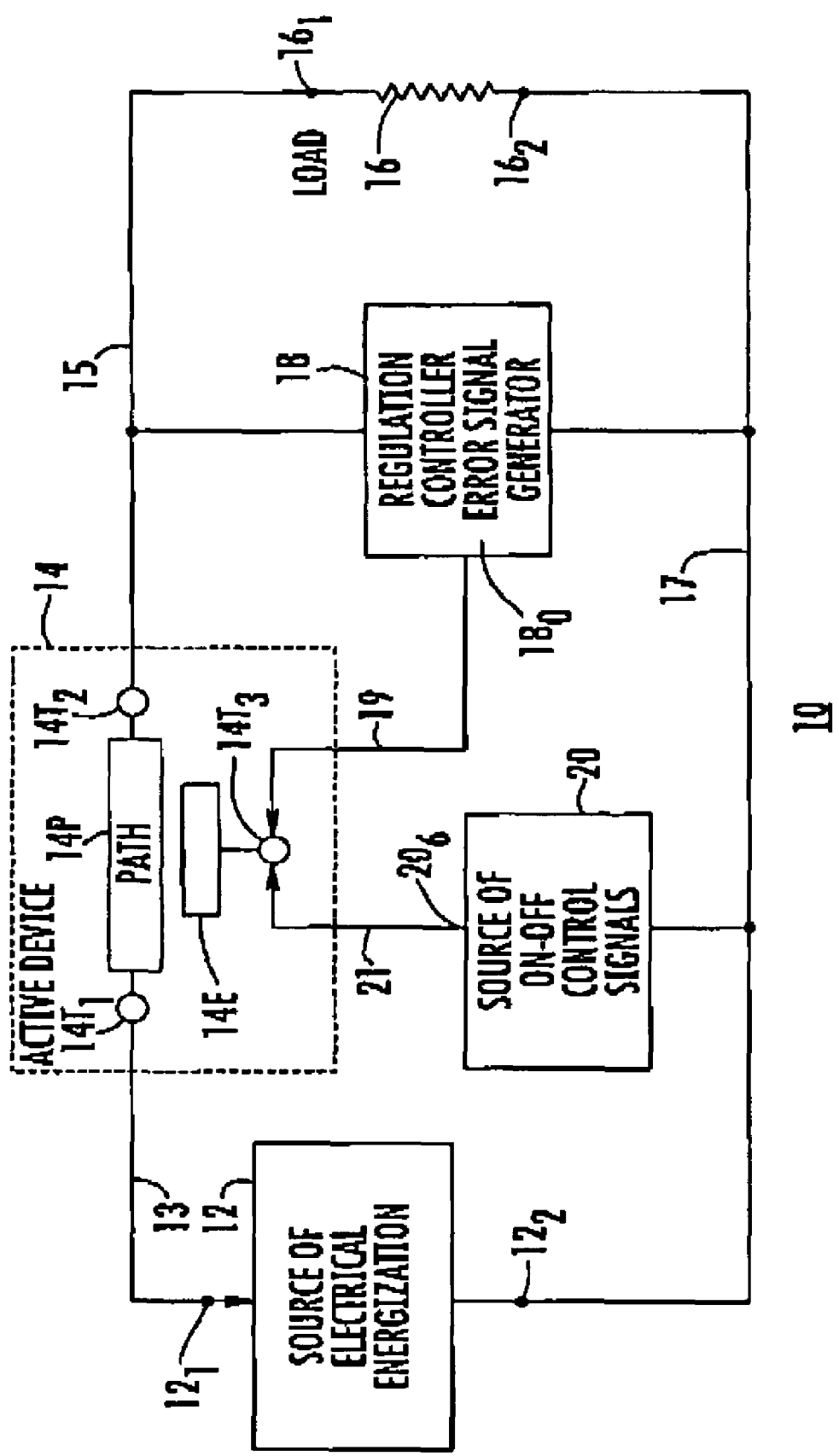
FIG. 1 is a simplified diagram in block and schematic form illustrating an aspect of the invention.

FIG. 1 is a simplified diagram in block and schematic form illustrating a switchable linear regulator 10 according to one aspect of the invention. In FIG. 1, a source of 12 of electrical energization has a port 12$_2$ connected to a common conductor 17. Source 12 applies nominally unregulated direct voltage (or possibly current) from a port 12$_1$ by way of a conductive path 13 to a first terminal 14T$_1$ of a preferably solid-state active device 14. Device 14 also includes a second terminal 14T$_2$ and a third terminal 14T$_3$. A controllable path 14P for the flow of current extends between electrodes or terminals 14T1 and 14T2. Flow of current through path 14P is controlled by application of electrical signal to a control electrode 14e associated with the path 14P. In the context of a bipolar transistor, the T1 and T2 terminals may be emitter and collector (not necessarily respectively), control electrode 14e may be a base, and terminal T3 a base terminal. In the context of field-effect transistors, terminals T1 and T2 may be source and drain (not necessarily respectively) terminals, the control electrode 14e may be a gate, and terminal T3 a gate terminal. In principle, the active device 14 could even be a vacuum tube with cathode, plate and control grid, but vacuum tubes are no longer in common use.

It should be noted that the term "between" and other terms such as "parallel" have meanings in an electrical context which differ from their meanings in the field of mechanics or in ordinary parlance. More particularly, the term "between" in the context of signal or electrical flow relating to two separate devices, apparatuses or entities does not relate to physical location, but instead refers to the identities of the source and destination of the flow. Thus, flow of signal "between" A and B refers to source and destination, and the flow itself may be by way of a path which is nowhere physically located between the locations of A and B. The term "between" can also define the end points of the electrical field extending between points of differing voltage or potential, and the electrical conductors making the connection need not necessarily lie physically between the terminals of the source. Similarly, the term "parallel" in an electrical context can mean, for digital signals, the simultaneous generation on separate signal or conductive paths of plural individual sub-signals, which taken together constitute the entire signal. For the case of current, the term "parallel" means that the flow of an electrical current is divided to flow in a plurality of separated conductors, all of which are physically connected together at disparate, spatially separated locations, so that the current travels from one such location to the other by plural paths, which need not be physically parallel.

As mentioned, source 12 of FIG. 1 produces electrical energization. Electrical energization can be in the form of voltage or current. Those skilled in the art know that energization requires power, and that power is transferred only when an applied voltage is accompanied by current flow, or when an applied current is accompanied by a finite voltage. A "voltage source" generally refers to a source of nominally constant voltage, regardless of the current drawn. Thus, the term implies a nominally zero source internal impedance, although all "voltage sources" have finite internal resistance. A "current source" refers to a source which produces a constant current, regardless of the voltage appearing across the load. As such, the term implies a nominally infinite internal source impedance, but again, in practice the internal impedances are finite.

In FIG. 1, terminal 14T2 is connected by a conductive path or conductor 15 to an end or terminal 16$_1$ of a load 16 represented as a resistor 16, the other end 16$_2$ of which is connected to a common conductor 17. Common conductor 17 is also connected to source 12, and provides a path for the return of current, as known to those skilled in the art.

Active device 14 of FIG. 1 is connected as a linear regulator by addition of a regulation control block 18. Block 18 is connected to both conductors 15 and 17, and performs the known function of sampling the voltage applied to or "across" the load, and comparing the sample of the load voltage with a reference potential to thereby generate an "error" signal at its output terminal or port 18o. The error signal represents generally the deviation of the actual load voltage from the desired load voltage. The error signal is applied by way of a path 19 to control terminal 14T3 of active device 14 in a degenerative manner. Those skilled in the art know that such a degenerative connection gives rise to a self-correcting "feedback" control system. That is to say, when the load voltage appearing across load 16 is undesirably higher than the desired "set" voltage, the control direction is such as to reduce the conduction of the controlled current path 14P, which reduced conduction in turn tends to reduce the load voltage to counteract the undesired voltage increase. Similarly, when the load voltage is undesirably lower than the desired set voltage, the degenerative control direction is such as to increase the conduction of the controlled current path 14P, which increased conduction in turn tends to increase the load voltage to counteract the undesired voltage decrease. Thus, regardless of the direction in which the load voltage deviates from the desired value, the degenerative control loop compensates for the change. Such control loops are well known. It should be noted that if the control loop were "regenerative" rather than degenerative, any deviation of the load voltage away from the set point would result in an increased deviation, rather than decreased deviation. Thus, the "polarity" or phase of the feedback loop must be appropriate.

According to an aspect of the invention, a source 20 of ON-OFF control signals is connected by a path to control terminal 14T3 of active device 14. The ON-OFF control signal is preferably purely bipolar, in that it selectively takes on one of two disparate states, such as "high" and "low," "positive" or "negative," or the like. According to an aspect of the invention, the ON-OFF control signal produced at output terminal or port 20o of source 20 supplants the feedback error signal from controller 18, at least in the "OFF" state of the ON-OFF control signal. That is to say, that the active device 14 coacts with voltage source 12 and load 16 as a linear feedback regulator in the ON state of the ON-OFF control signal. In this linear feedback regulation mode of operation, the voltage applied from terminal 14T2 to the load 16 (all measured relative to the common conductor 17) tends to be maintained at a stable, predetermined value. It should be noted that there is no additional solid-state switching element lying in conductive path 15 which might adversely affect the voltage applied to the load 16. That is, during the ON state of the linear regulator, the sensed voltage is taken across the load itself. When the ON-OFF control signal applied to the control terminal 14T3 takes on the OFF state, the control electrode 14e nominally causes the controllable path 14P to stop conduction or become open-circuited. With cessation of the conduction through path 14P, no voltage is developed across the load 16. Looked at another way, conductors 13 and 15 together interconnect source 12, path 14P, and load 16 in a series or serial manner, so that the same current flows in each element of the serially connected elements. Those skilled in the art know that the serial connection extends to the return path 17, so that the combination of conductors 13, 15, and 17 together interconnect source 12, path 14P, and load 16 in a loop. Thus, substitution at control terminal 14T3 of the OFF control signal from source 20 for the error or feedback control signal produced by controller 18 results in switching between (a) a regulated-voltage output applied by way of path 15 to the load 16 and (b) no voltage applied by way of path 15 to the load 16. In effect, the linear voltage regulation provided by active device 14 coacting with regulation controller 18 is directly switched OFF by the same active element 14. As such, there is a cost advantage over an arrangement in which a separate active device is coupled between the regulator device and the load to perform the switching. As mentioned, there is also better control of the voltage applied to the load during the ON mode of operation, due to elimination of the control path of a separate switch device. Further, no ohmic or power losses can occur in such a separate switch.

Substitution of one control voltage for another at the path control terminal 14T3 of active device 14 of FIG. 1 can be accomplished in a simple manner by appropriate selection of the input impedance of the terminal, the output impedance of regulation control (error signal) source 18, and the output impedance of ON-OFF control signal source 20. In particular, what is desired is that the error signal control the active device until such time as the OFF command signal is produced by the source of ON-OFF control signals. Most active control devices have the characteristic of controlling a relatively large amount of power under the control of a relatively low-power signal. In order to draw relatively low power from the control signal source, the impedance of the control terminal of the active device is relatively high. This relatively high impedance tends to draw little current from the regulation control signal source 18 for ordinary values of control voltage. The output impedance of regulation controller 18 (the impedance presented by regulation controller 18 to the outside world) can be selected to be a finite value, which is generally less than the input impedance of terminal 14T3. The output impedance of ON-OFF control signal source 20 in its OFF signal state is then selected to be much lower than the output impedance of regulation control signal source 18, and much higher in the ON signal state. In this context, "much lower" means 1/10 or less, and "much higher" means three times or more. In general, this can be accomplished by causing ON-OFF control signal source to present an open-circuit at port 20o in the ON state of the switched linear regulator 10, and to present a short-circuit between port 20o and conductor 17 in the OFF state. Under such conditions, the regulation control signal internally generated by controller 18 applied essentially unchanged to active device control terminal 14T3 in the ON state, and the regulation control signal is shorted or shunted to reference potential in the OFF state. A term sometimes used for this form of control is that of "swamping" one control signal by another. Any slight reduction in the magnitude of the regulation control signal attributable to the finite impedance of the open-circuit at port 20o in the ON state merely represents a reduction in voltage control loop gain, which is readily compensated for by increasing the loop amplification. The determination of input and output impedances, voltages and currents in circuits are well known in such categories as Thévenin's theorems and Kirchoff's laws.

Thus, the arrangement of FIG. 1 provides linearly regulated voltage using a single active device to control the voltage, and the same active device is switched ON and OFF to thereby control the application of the controlled voltage to the load.

It is common to use monolithic integrated circuits for devising control circuits, because in general specialized monolithic integrated circuits are easy to combine to produce repeatable results. There are situations in which such integrated circuits are not advantageous, and one of these arises when the voltage to be controlled exceeds the voltage rating of the integrated circuit. Monolithic integrated circuits are commonly available with voltage ratings of ±15 volts, but higher voltage ratings are not readily available. The amplifiers associated with the transmit function of a transmit-receive (TR) module often require more than 30 volts. In one embodiment of an aspect of the invention, the TR modules require about 50 regulated volts.

Figure 2:
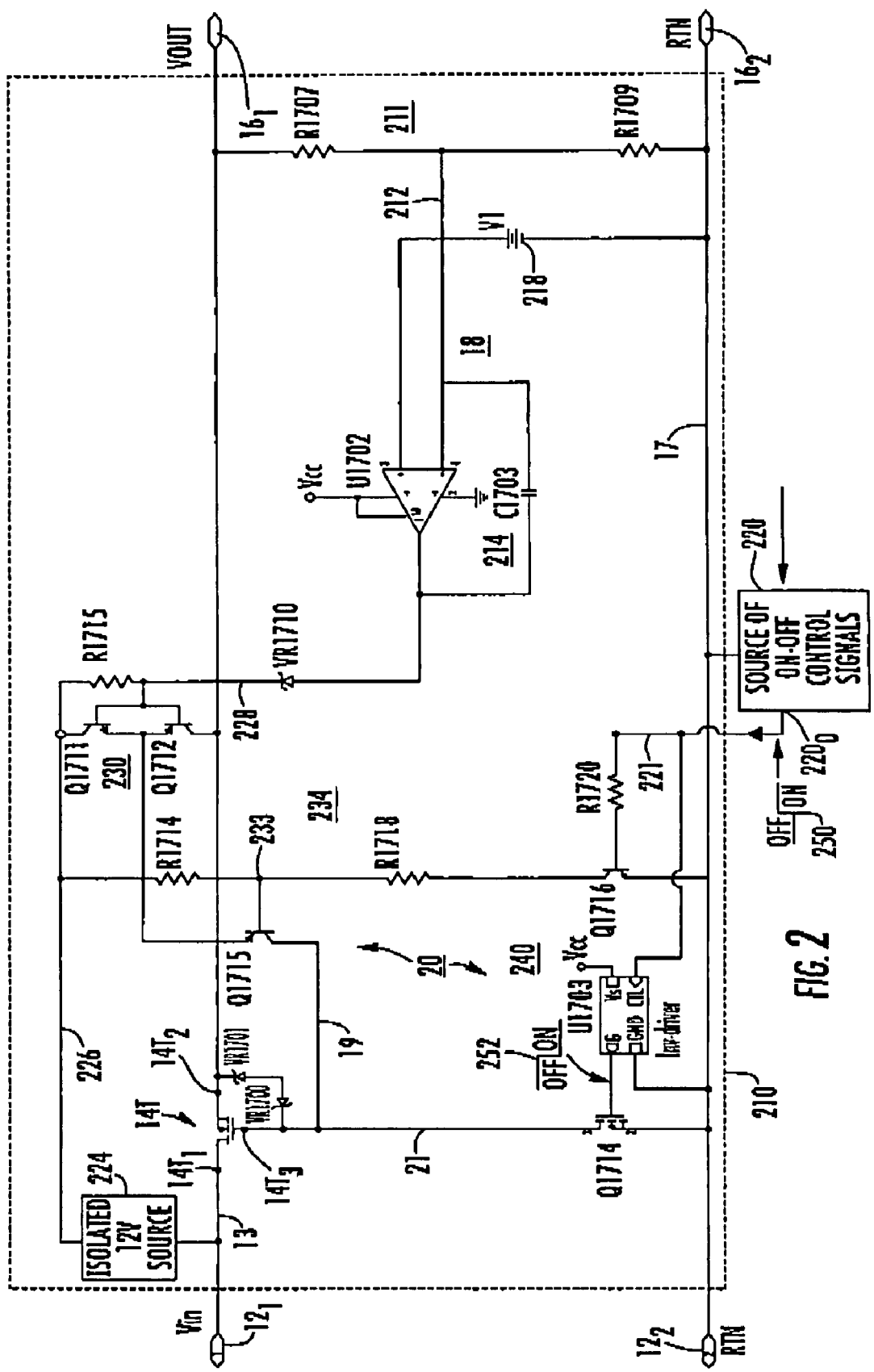
FIG. 2 is a more detailed diagram of an arrangement similar to that of FIG. 1.

FIG. 2 is a diagram in block and schematic form of a linearly regulated switch 210 according to an aspect of the invention, arranged to regulate 50 volts while operating monolithic control integrated circuits from supply voltages Vcc less than 30 volts. In FIG. 2, elements corresponding to those of FIG. 1 are designated by like alphanumerics. Voltage regulation controller 18 includes a voltage sensing divider 211 including resistors R1707 and R1709, which produce the sensed voltage signal on a tap or conductor 212. Voltage sensing divider 211 may be frequency-compensated in known manner. The sensed voltage on conductor 212 is applied to the inverting (−) input port 4 of a monolithic integrated-circuit operational amplifier U1702. The gain and frequency response of operational amplifier U1702 are controlled by co-action of the voltage sensing divider 211 with one end of a degenerative feedback network 214 including at least a capacitor C1703, and which may also include one or more resistors, if desired. The other end of degenerative feedback network 214 is connected to output terminal 1 of monolithic integrated-circuit operational amplifier U1702. The sensed voltage on tap 212 is compared in operational amplifier U1702 with a reference voltage from a reference voltage source 218 applied to noninverting (+) input port 3.

Monolithic operational amplifier U1702 of FIG. 2 receives power at its +v terminal 6 from source Vcc, which may be a 12-volt source, and the reference (or "ground") voltage is applied to −V terminal 2. An unprocessed error voltage is generated at output terminal 1 of U1702. In this context, "unprocessed" means that the error voltage is nominally centered at +6 volts (half of the Vcc value) rather than at some higher voltage necessary to control the active voltage regulating device 14.

Conductor 13 of FIG. 2 receives nominally unregulated +50 volts from terminal 12₁. An isolated ancillary voltage source 224 has its reference conductor connected to conductor 13, and produces an additional 12 volts over the nominal +50 volts, totaling 62 volts (relative to common conductor 17), which is applied to a supply conductor 226.

As illustrated in FIG. 2, a pair of back-to-back zener diodes VR1700 and VR1701 are connected across or between active device terminals 14T2 and 14T3 to aid in reducing or limiting undesired voltage transients.

An emitter follower 230 of FIG. 2 includes an NPN transistor Q1711 having its collector connected to the +62-volt supply on conductor 226, its emitter connected to the emitter of a PNP transistor Q1712, and its base connected to the base of PNP transistor Q1712. The common bases of transistors Q1711 and Q1712 are connected by way of a resistor R1715 to supply conductor 226, to define an emitter-follower, and are also coupled to the cathode of a 51-volt zener diode VR1710. The anode of zener diode VR1710 is coupled to the output terminal 1 of operational amplifier U1702. Since output terminal 1 of operational amplifier U1702 is nominally at about +6 volts, the positive end of zener diode VR1710 on conductor 228 is nominally above +6 volts by the value of the zener diode voltage, corresponding to about +57 volts (relative to common conductor 17), and varies about that level in consonance with the error. Thus, this arrangement translates the nominal +6-volt output level of operational amplifier U1702 to about +57 volts, with the signal level responding to the error voltage.

The conjoined emitters of transistors Q1711 and Q1712 of emitter-follower 230 of FIG. 2 are connected to the emitter of a PNP transistor Q1715. The collector of transistor Q1715 is connected by way of a path 19 to the control terminal 14T3 of active device 14. Transistor Q1715 acts as a switch, to translate the voltage-offset error signal from emitter-follower 230 to the control terminal 14T3 of active device 14 during those intervals in which transistor Q1715 is conductive or saturated, and to prevent the voltage-offset error voltage from reaching the control terminal 14T3 when transistor Q1715 is nonconductive. This in turn provides regulation control of the voltage applied by active device 14 over conductor 15 for application to the load at terminal 16₁ during those times when switch transistor Q1715 is ON or saturated, and to turn off the regulation loop during those times in which transistor Q1715 is OFF or nonconductive.

The base of transistor Q1715 is connected to a tap 233 on a resistor string including resistors R1714 and R1718, which are connected to reference potential at conductor 17 by way of the collector-to-emitter path of an NPN transistor Q1716.

Transistor Q1715 is OFF or nonconductive when no current flows to its base from reference conductor 17, which occurs when Q1716 is OFF. Transistor Q1716 has its base connected by a resistor R1720 and a conductor 221 to output terminal 220o of source 220 of external ON-OFF control signals. Transistor Q1716 is OFF when its base receives nominally zero volts from source 220. Thus, when ON-OFF control signal source 220 produces a LOW signal on conductor 221, transistor Q1715 is OFF or nonconductive, and no current flows to the base of transistor Q1715. In the absence of base current, transistor Q1715 is or remains OFF. When transistor Q1715 is OFF, the voltage-shifted error signal produced by push-pull follower 230 is not applied to the control terminal 14T3 of active device 14, and there is no linear regulation control. In other words, the linear regulator function is disabled when the ON-OFF control signal produced by source 220 is LOW. Contrariwise, when the ON-OFF control signal produced by source 220 is HIGH (sufficient voltage to turn ON the base-emitter junction of transistor Q1716), current flows through the collector-to-emitter path of Q1716 and to the base of transistor Q1715, bringing it into saturation. With Q1715 saturated, the voltage-shifted error signal produced by push-pull follower 230 is applied through the emitter-to-collector path of saturated transistor Q1715 to control terminal 14T3 of active control device 14, and the linear regulator function is enabled. Thus, the linear regulation device 14 can be operated in a linear feedback regulation loop when transistor Q1715 is saturated. Since transistor Q1715 enables and disables the linear regulation control loop, it corresponds to source 20 of ON-OFF control signals of FIG. 1.

Figure 3:
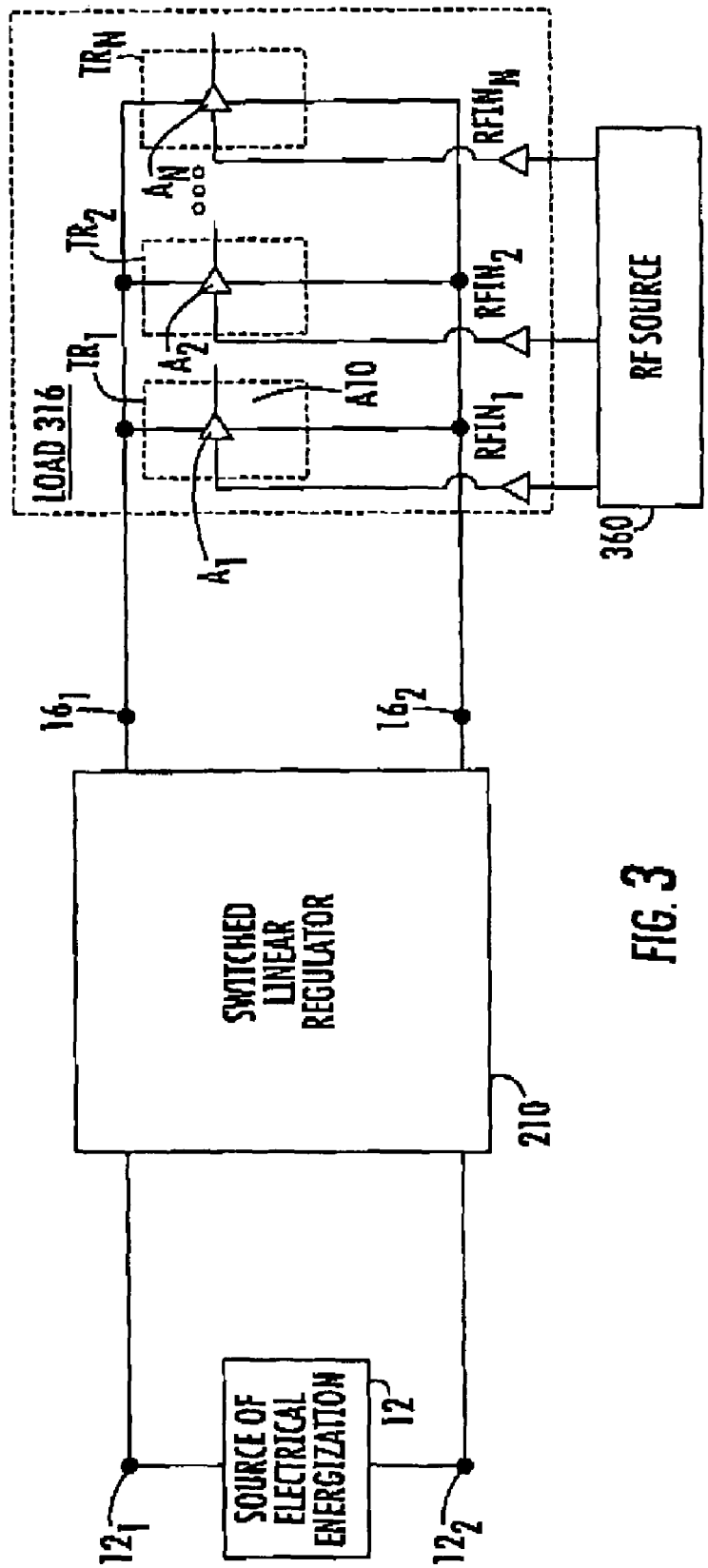
FIG. 3 is a representation of the arrangements of FIGS. 1 andor 2 in the context of a particular load.

FIG. 3 is a simplified diagram in block form, illustrating a power source 12 and switched linear regulator 210 driving a load 16 including a plurality of transmit-receive (TR) modules. As illustrated, a load 316 includes a plurality of TR modules TR1, TR2, ..., TRN. Each TR module includes at least one RF amplifier used for transmission. In first TR module TR1 the transmit amplifier is A1, in second TR module TR2 the transmit amplifier is A2, ..., and in $N^{th}$ TR module TRN the transmit amplifier is AN. As illustrated, the positive terminals $16_1$ and $16_2$ across which the switched linearly regulated voltage is developed are connected to the upper and lower sides of amplifiers A1, A2, .... The connection to the upper and lower sides represents connection of the power terminals of the amplifiers to the supply connections. Thus, the switched linearly regulated supply voltage is applied to one or more transmit or power amplifiers in one or more TR modules The radio-frequency (RF) signal is applied to the various amplifiers A1, A2, ... from a source 360 of RF signals by way of paths designated Rfin. Thus, RF signal is applied to amplifier A1 by way of a path Rfin1, RF signal is applied to amplifier A2 by way of a path Rfin2, ..., and RF signal is applied to amplifier AN by way of a path RfinN. According to an aspect of the invention, the RF signal is continuously applied by way of the Rfin paths to the amplifiers, and the switching required for pulse modulation of the RF signal results from the ON and OFF states of the switched linearly regulated supply 10 or 210. The RF signals applied from block 360 to the TR modules may be of similar amplitude and phase, or dissimilar in amplitude and phase, all as known in the array antenna arts.

It has been discovered that in the context of a load 316 such as that described in conjunction with FIG. 3, the arrangement of FIG. 2, as so far described, may exhibit a lower-than-desired rise time, so that the switched RF signal changes amplitude immediately after the nominal turn-ON time. That is, even when transistor Q1715 is nonconductive, current may continue to flow through active device 14 to the load.

Referring again to FIG. 2, a discharge or speed-up circuit designated generally as 240 is connected to receive ON-OFF control signals at conductor 221 and is also connected to conductor 19 and to the control electrode 14T3 of active device 14. Speed-up circuit 240 includes an integrated-circuit inverter U1703, which receives the ON-OFF control signals from source 220 and produces inverted ON-OFF control signals, designated 252, at the gate 1 of a FET Q1714. The source terminal 2 of FET Q1714 is connected to reference conductor 17. When source 220 of control signals commands, by a logic LOW value or level of signal 250 on conductor 221, that the linear regulating switch circuit 210 of FIG. 2 be in a switched-OFF mode, the LOW value on conductor 21 is inverted to HIGH at the gate of FET Q1714, as suggested by signal representation 252. FET Q1714 responds to the logic HIGH level at its gate by becoming conductive. When FET Q1714 is conductive, conductor 19 and the control electrode 14T3 of active device 14 are connected to reference conductor 17 by the low internal resistance of the source-to-drain path of FET Q1714. This connection quickly dissipates any residual charge which may remain at the control electrode of active device 14 or in the circuit elements connected thereto, and allows the active device to quickly complete the transition from the linear regulating mode to the switched-OFF mode.

From the description, it can be understood that transistor Q1715 acts as a switch transistor serially coupled between the voltage-shifted error signal from emitter follower 230 and the control terminal 14T3. Thus, transistor Q1715, together with transistor Q1716, may be viewed as being a part of ON-OFF signal source 20 of FIG. 1. In addition, shunt transistor Q1714 acts as a shunt switch transistor in parallel with the voltage-shifted error signal, which "shorts to ground" the voltage-shifted error signal in the OFF state. Thus, there are two complimentary switches which coact to more-or-less simultaneously open the degenerative linear feedback voltage control loop, and to short to ground (a) any charge on at the control terminal and (b) any residual error signal. Either of these switches may be used independently, if desired.

Thus, a switched linear regulator according to an aspect of the invention includes a control device with a controlled current path and a control electrode. The current path is connected in series with a source of nominally unregulated voltage and a load. An error signal generator compares the load voltage with a reference value to generate a degenerative error signal. The error signal is coupled to the control electrode with a voltage offset. An OFF control signal source includes a transistor which is connected to the control electrode to swamp or overpower the error signal, and render the controlled current path nonconductive. Thus, the same active control element both linearly regulates and provides an ON-OFF function. A speed-up transistor responds to the OFF signal to short the control electrode to a reference voltage to quickly discharge capacitance at the control electrode, and to maintain the active control element in a nonconductive state which opens the linear voltage regulating feedback loop.

A switched source of linearly regulated voltage (10; 210) according to an aspect of the invention comprises a source (12) of nominally unregulated direct voltage, and a load (16; 316) for receiving switched regulated direct voltage. A solid-state device (14) defines first (14T1) and second (14T2) terminals and a controllable path (14P) for the flow of current therebetween. The solid-state device (14) also defines an electrical control electrode or terminal (14T3) for controlling the flow of current through the controllable path (14P). A current conducting arrangement or means (13, 15, 17) serially couples or connects the source (12), the path (14P), and the load (16; 316) to allow serial flow of energizing current during those times in which the path (14P) is conductive. A regulation control arrangement or means (18) senses (by divider 211) the voltage across the load (16, 316), and compares the sensed voltage with a reference voltage (218) to generate a degenerative error signal at the control terminal (14T3), whereby the voltage across the load tends to be maintained constant. An ON-OFF control signal source (240) is coupled to the control terminal (14T3), for overriding or swamping the error signal and for disabling the path (14P) during OFF times. In a switched source (10; 210) according to one embodiment of this aspect of the invention, the solid-state device (14) is a field-effect transistor defining a source and a drain, and a controllable path (14P) for current therebetween, and also defining an electrical control gate terminal (14T3) for controlling the flow of current through the controllable path (14P). In a preferred embodiment, the load (16) comprises an RF amplifier (A1) including an RF input port (A1*i*) and an RF output port (A1*o*), and in which the amplifier (A1) continuously receives RF signal at the input port (A1*i*), for amplifying RF signal applied to the input port to produce amplified RF signal at the output port (A1*o*) during those times in which the ON-OFF control signal commands an ON state, and for producing no amplified RF signal at the output port (A1o) during those times in which the ON-OFF control signal commands an OFF state.

According to another aspect of the invention, a switched source (10, 210) of linearly regulated voltage comprises a source (12) of nominally unregulated direct voltage and a load (16) for receiving switched regulated direct voltage having a first value (in the vicinity of 50 volts). A solid-state device (14) defines first (14T1) and second (14T2) terminals and a controllable path (14P) for the flow of current therebetween. The solid-state device (14) also defines an electrical control terminal (14T3) for controlling the flow of current through the controllable path (14P). Current conducting means (13, 15, 17) serially couple the source (12), the path (14P), and the load (16) to allow flow of current during those times in which the path (14P) is conductive. Regulation control means (18; 218) sense the voltage across the load (16), and compare the sensed voltage (at tap conductor 212) with a reference voltage (218) to generate (at output terminal 1 of U1702) a degenerative error signal centered about a second voltage (about 6 volts) having a value different from the first value (about 50 volts). Voltage shifting means (VR1710) are coupled to the regulation control means (18) and to the control terminal (14T3), for shifting the value of the degenerative error signal (about 6 volts) to the first value (about 50 volts) at the control terminal (14T3), whereby, or as a result of which the voltage across the load (16) tends to be maintained constant. An ON-OFF control signal source (240) is coupled to the control terminal (14T3), for overriding the error signal and for disabling or rendering nonconductive the path (14P) during OFF times.

What is claimed is:

1. A switched source of linearly regulated voltage, said switched source comprising:
a source of nominally unregulated direct voltage;
a load for receiving switched regulated direct voltage having a first value;
a solid-state device defining first and second terminals and a controllable path for the flow of current therebetween, also defining an electrical control terminal for controlling the flow of current through said controllable path;
current conducting means serially coupling said source, said path, and said load to allow flow of current during those times in which said path is conductive;
regulation control means for sensing the voltage across said load, and for comparing the sensed voltage with a reference to generate a degenerative error signal centered about a second voltage having a value different from said first value;
a voltage shifting arrangement coupled to said regulation control means and to said control terminal, for shifting the value of said degenerative error signal to said first value at said control terminal, whereby the voltage across said load tends to be maintained constant; and
an ON-OFF control signal source coupled to said control terminal, for overriding said error signal and for disabling said path during OFF times.

2. A source according to claim 1, wherein said solid-state device is a field-effect transistor defining a source and a drain, and a controllable path for current therebetween, and also defining an electrical control gate terminal for controlling the flow of current through said controllable path.

3. A source according to claim 1, wherein said load comprises an RF amplifier including an RF input port and an RF output port, which amplifier continuously receives RF signal at said input port, for amplifying RF signal applied to said input port to produce amplified RF signal at said output port during those times in which said ON-OFF control signal commands an ON state, and for producing no amplified RF signal at said output port during those times in which said ON-OFF control signal commands an OFF state.

* * * * *